Dec. 2, 1958 — J. S. KESSLER — 2,862,275
TOGGLE-TYPE CONNECTING ASSEMBLIES HAVING
DETACHABLE CONNECTING BAILS
Filed Oct. 15, 1956
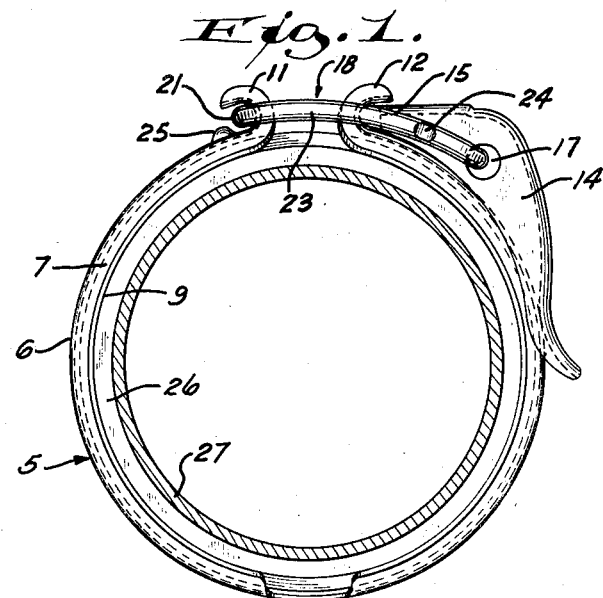
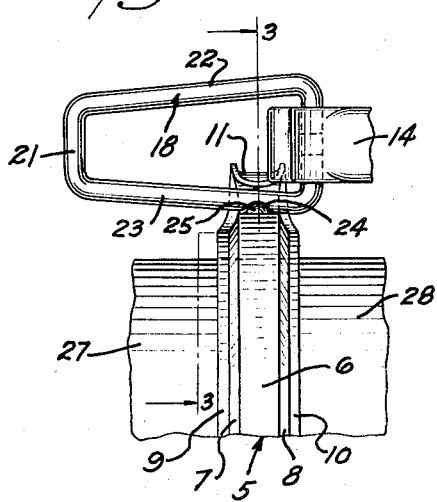
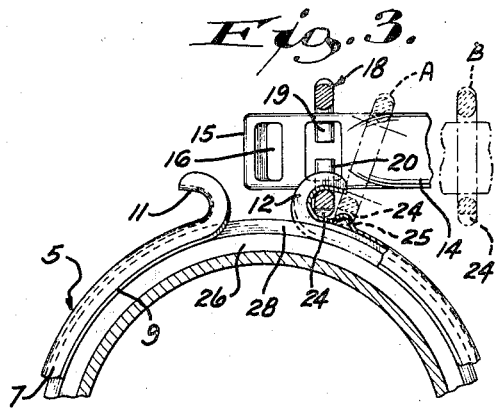
INVENTOR.
Joseph S. Kessler
BY
Morsell & Morsell
ATTORNEYS.

United States Patent Office 2,862,275
Patented Dec. 2, 1958

2,862,275

TOGGLE-TYPE CONNECTING ASSEMBLIES HAVING DETACHABLE CONNECTING BAILS

Joseph S. Kessler, Kenosha, Wis., assignor to Ladish Co., Cudahy, Wis., a corporation of Wisconsin Application October 15, 1956, Serial No. 616,019

4 Claims. (Cl. 24—270)

This invention relates to improvements in toggle-type connecting assemblies having detachable connecting bails.

In industries, such as the food industry, wherein it is of utmost importance that sanitary conditions at all times prevail, the equipment used therein must be frequently disassembled and cleaned. To this end the equipment must be designed with a minimum of parts, said parts being associated in easily disassembled relationship and being devoid, as much as possible, of screw threading, corners, or other crevices where food particles may lodge.

Because it is particularly well adapted for sanitary applications, the V-type clamping band, used in connection with flanged coupling members, has replaced bolted type connections at many points in food handling equipment.

In my issued Patent No. 2,649,632 a toggle-type connecting assembly of this general type is disclosed. Here, however, the bail normally remains connected at one of its ends to an end of the clamping band and at its other end to the handle. This is somewhat awkward during cleaning. While it is possible in the construction of my prior patent to remove the snug fitting pin which normally retains the bail in assembled position, this is not always easy to accomplish and the pin may get lost.

It is a general object of the present invention to provide an improved construction of the class described wherein the bail is normally retained in assembled relationship with an end of the band without requiring use of a retaining pin, and wherein said bail and its attached handle are readily disconnectable from the band by mere manipulations of the bail. Thus the parts may be easily separated for cleaning and quickly reassembled. The construction also simplifies assembly at the time of original manufacture.

A more specific object of the invention is to provide a construction as above described wherein the bail is normally retained in assembled position by an integral bump on the clamping band, there being a notch in a side of the bail whereby if the bail is manipulated to bring the notch into registration with the bump the bail can be readily detached.

A further object of the invention is to provide a toggle-type connecting assembly which is simple and inexpensive to manufacture, foolproof in operation, neat in appearance, and otherwise well adapted for the purpose described.

With the above and other objects in view, the invention consists of the improved toggle-type connecting assembly having a detachable connecting bail, and all of its parts and combinations, as set forth in the claims, and all equivalents thereof.

In the accompanying drawing, illustrating one complete embodiment of the preferred form of the invention, in which the same reference numerals designate the same parts in all the views:

Fig. 1 is a transverse sectional view through a conduit near a joint showing a side view of the improved toggle-type connecting assembly while in clamping position;

Fig. 2 is a fragmentary view looking at the periphery of the clamping band near one end thereof, the clamp being released and the bail being shown after it has been manipulated to a position where it can be detached; and Fig. 3 is a fragmentary sectional view taken on the line 3—3 of Fig. 2, the dot-and-dash lines illustrating steps in the removal of the bail.

Referring more particularly to the drawings, the numeral 5 indicates a V-type clamping band which is preferably circular in outline. It has a cylindrical peripheral wall portion 6 with divergent inwardly projecting annular wall portions 7 and 8 which are formed at their inner edges with oppositely projecting annular flanges 9 and 10. The juxtaposed opposite end portions of the band are bent into the form of hooks or lips as at 11 and 12. Diametrically opposite the hook portions, the walls 7 and 8 and flanges 9 and 10 are cut-away as at 13 to leave and extent of the wall 6 which is flexible.

The improved connecting assembly is adapted to be assembled around juxtaposed flanges 26 of conduits 27 and 28 which are to be connected, there being a suitable gasket between flanges 26 of the two pipe sections. When the clamp is in the closed position of Fig. 1, the ends of the clamping band 5 are drawn together causing the diverging sides 7 and 8 of the clamping band to act on the tapered outer sides 28 of the pipe flanges 26 to draw the faces of the flanges toward one another and compress the gasket, thus making a firm joint.

A locking handle 14 of irregular conformation is channel-shaped in cross-section for the major portion of its length and has a width greater than the width of the hook 12. At one end of the handle is a nose portion 15 which is adapted to be pivotally seated within the hook 12 as shown in Fig. 1. Adjacent its nose the handle 14 is formed with an aperture 16 which is of such size and so positioned as to receive the end of the hook 12 when the handle is swung outwardly about its nose to release the clamp.

Spaced inwardly from the nose portion 15 of the handle is a pair of aligned holes 17. An elongated bail 18 has a pair of inwardly directed end portions 19 and 20 which project through the holes 17. The bail also has a closed loop portion 21 which is normally engaged in the hook 11 on the other end of the band as shown in Fig. 1. The bail also has side portions 22 and 23, one of which is notched as at 24 (see Fig. 1).

A stamped bump 25 which is integral with and projects outwardly from the periphery 6 of the band adjacent the hook 11 is positioned to normally retain the closed end 21 of the bail 18 in assembled position with respect to the hook 11.

The notch 24 in the side 23 of the bail is slightly wider than the transverse dimension of the bump 25. With this arrangement, when the clamping lever 14 is released from the hook 12 to loosen the clamp and free the handle from the hook 12, then the side 23 of the bail may be slid to the position of Fig. 2 so as to be within the hook 11 and so as to bring the notch 24 into registartion with the bump 25. Then the notch is rocked and slid over the bump as indicated in the dot-and-dash line position (A) of Fig. 3 and is ultimately withdrawn from the bump as indicated by the dot-and-dash line position (B) of Fig. 3.

With the handle and bail thus detached from the clamp they may be separately cleaned with greater thoroughness and ease. In addition the use of the notch 24 and bump 25 simplifies original manufacture and assembly of the clamp.

To effect such assembly or reassembly after cleaning, the reverse procedure to that just described is performed.

After the side 23 of the bail has been engaged within the hook 11, then the side 23 is slid longitudinally in the hook, and the bail is then turned to bring the closed end 21 within the hook. There is sufficient clearance between the bump 25 and the seat of the hook 11 to permit such manipulation, but the bump is close enough to the seat of the hook 11 as to normally serve its purpose of retaining the bail in assembled position.

Various changes and modifications may be made without departing from the spirit of the invention, and all of such changes are contemplated as may come within the scope of the claims.

What I claim is:

1. A toggle type connecting assembly for a clamping ring having a pair of relatively movable juxtaposed end portions adapted to be drawn and held together comprising, a lip on one of said end portions directed away from said end portion, a handle removably and pivotally engageable with the other end portion of said clamping ring, a bail pivotally connected to said handle and having a closed loop with a front portion shiftably engaged with said lip, said bail also having side portions extending transversely of said front portion and shiftable to a position under said lip when said handle is disengaged, and retaining means adjacent said lip position to normally maintain the front portion of the closed loop in engagement with the lip, one of the side portions of said bail having a notch therein normally located out of registration with said retaining means and of such size as to receive at least a portion of said retaining means when the front portion of the loop is shifted out of engagement with said lip and when said notched side portion is shifted into such engagement to permit removal of the bail.

2. A toggle type connecting assembly for a clamping ring having a pair of relatively movable juxtaposed end portions adapted to be drawn and held together comprising, a lip on one of said end portions directed away from said end portion, a handle removably and pivotally engageable with the other end portion of said clamping ring, a bail pivotally connected to said handle and having a closed loop with a front portion shiftably engaged under said lip, said bail also having side portions extending transversely of said front portion and shiftable to a position under said lip when said handle is disengaged, and integral retaining means on said clamping ring adjacent said lip positioned to normally maintain the front portion of the closed loop in engagement with the lip, one of the side portions of said bail having a notch therein normally located out of registration with said retaining means and of such size as to receive at least a portion of said retaining means when the front portion of the loop is shifted out of engagement with said lip and when said notched side portion is shifted into such engagement to permit removal of the bail.

3. A toggle type connecting assembly for a clamping ring having a pair of relatively movable juxtaposed end portions adapted to be drawn and held together comprising, a lip on one of said end portions directed away from said end portion, a handle removably and pivotally engageable with the other end portion of said clamping ring, a bail pivotally connected to said handle and having a closed loop with a front portion slidably engaged with said lip and having a side portion extending transversely of said front portion, a bump on the clamping ring adjacent said lip positioned to normally maintain the front portion of the closed loop in engagement with the lip, said bail having a notch in said side portion of such size as to accommodate the bump when the bail is slid with respect to said lip to move the front portion of the bail out of engagement with said lip and to bring said notched side portion into such engagement to permit removal of the bail.

4. A toggle type connecting assembly for a clamping ring having a pair of relatively movable juxtaposed end portions adapted to be drawn and held together comprising, a lip on one of said end portions directed away from said end portion, there being a bail opening between the lip and clamping ring, a handle removably and pivotally engageable with the other end portion of said clamping ring, a bail pivotally connected to said handle and having a closed loop with a front portion shiftably engaged with said lip and having a side portion extending transversely of said front portion, an integral stamped bump adjacent said lip on the clamping ring and inwardly of its end positioned to normally prevent withdrawal of the front portion of the closed loop from said bail opening which is between the lip and clamping ring, said bail having a notch in said side portion normally located out of registration with said bump and of such size as to accommodate the bump when said front portion of the bail is shifted out of engagement with said lip and when said notched side portion is shifted into such engagement to permit removal of the bail.

References Cited in the file of this patent

UNITED STATES PATENTS

| | | |
|---|---|---|
| 925,910 | Hoke | June 22, 1909 |
| 2,649,632 | Kessler | Aug. 25, 1953 |